C. LOTTE.
POWER SHOVEL OR EXCAVATING MACHINE.
APPLICATION FILED JAN. 30, 1920.
1,396,375.
Patented Nov. 8, 1921.
4 SHEETS—SHEET 1.
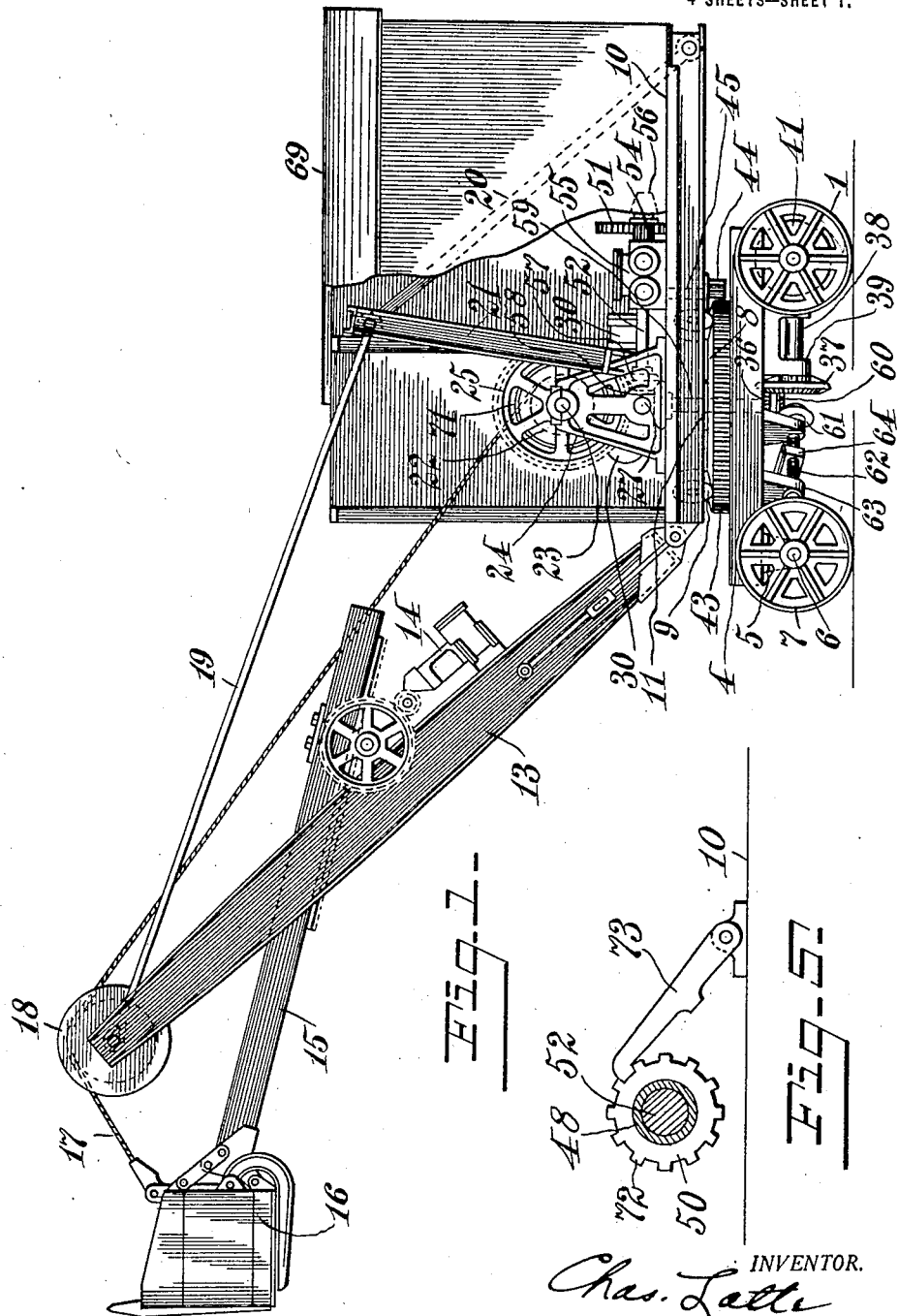
INVENTOR.
Chas. Lotte
BY R. J. McCarty.
his ATTORNEY

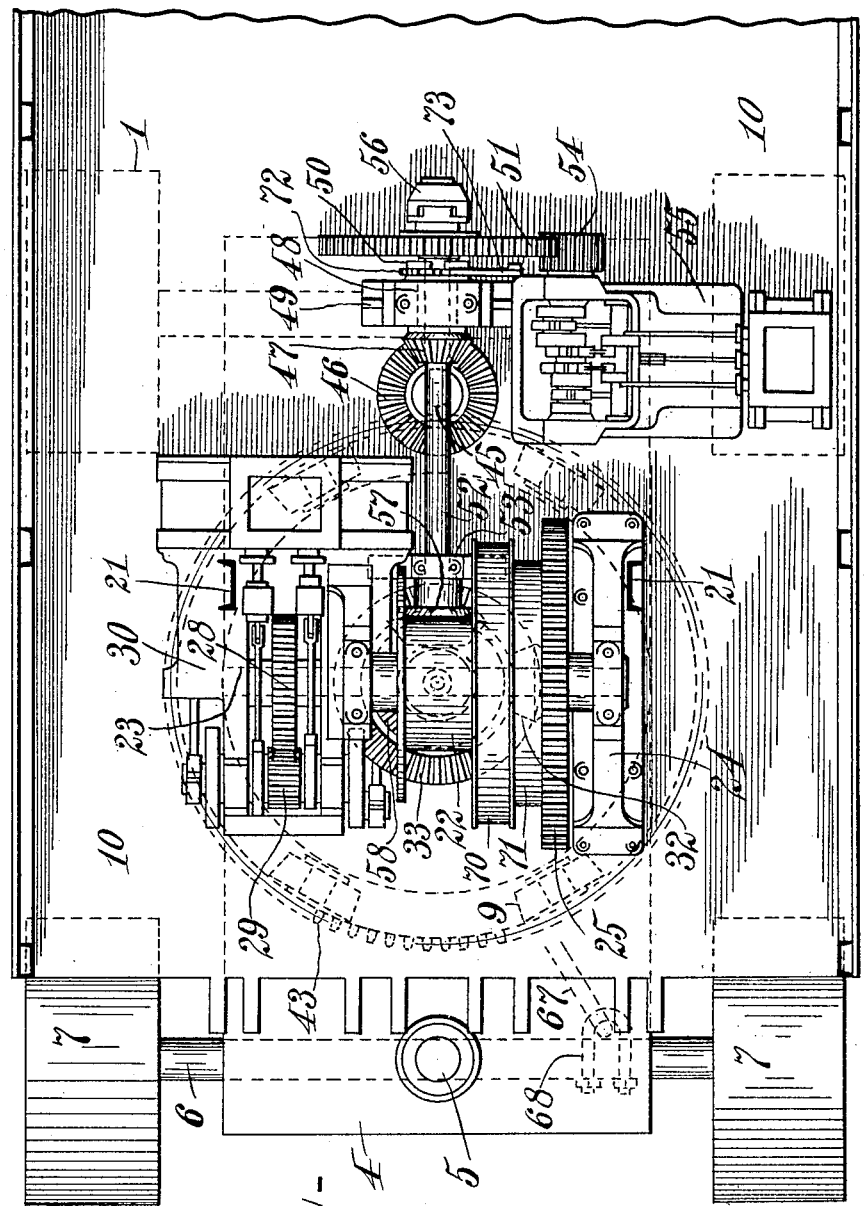

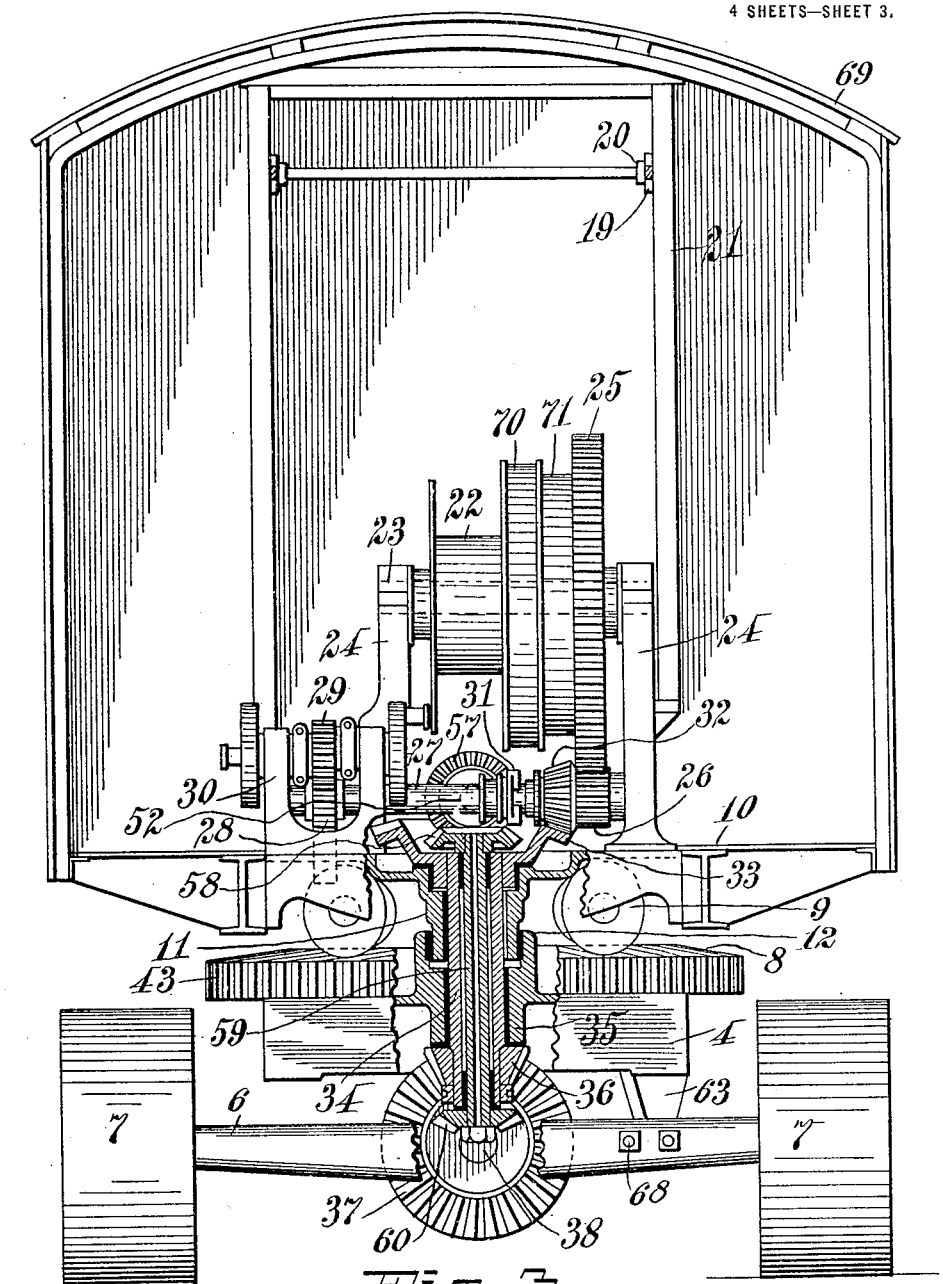

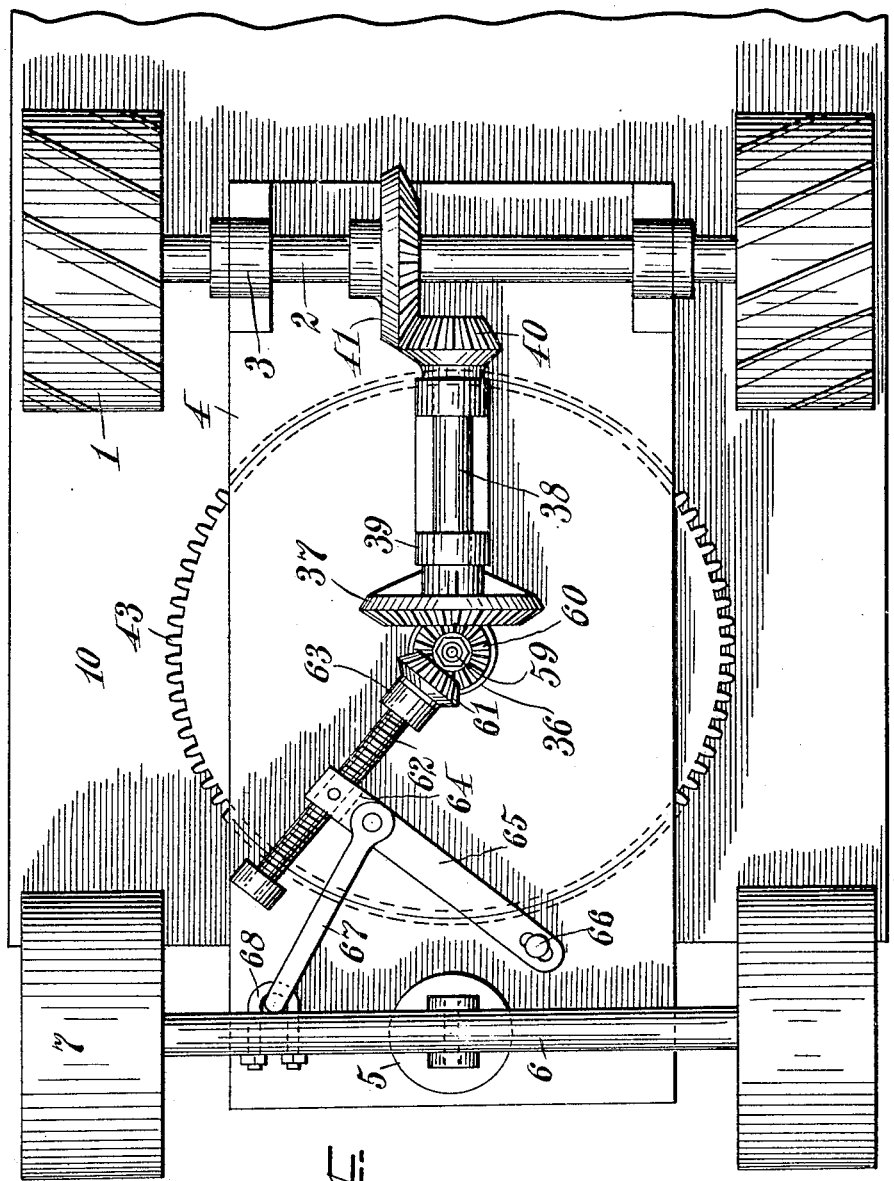

UNITED STATES PATENT OFFICE.

CHARLES LOTTE, OF MARION, OHIO.

POWER-SHOVEL OR EXCAVATING-MACHINE.

1,396,375.  Specification of Letters Patent.  Patented Nov. 8, 1921.

Application filed January 30, 1920. Serial No. 355,089.

*To all whom it may concern:*

Be it known that I, CHARLES LOTTE, a citizen of the United States, residing at Marion, in the county of Marion and State of Ohio, have invented certain new and useful Improvements in Power-Shovels or Excavating-Machines, of which the following is a specification.

This invention relates to new and useful improvements in the small type of power shovels or excavating machines.

The main object of the invention is to provide a machine of this type in which a single shaft and compound gearing are utilized for hoisting, and for propelling the machine. The propelling is accomplished through means of a clutch on said shaft which is engaged at such time, and is disengaged when the hoisting operation is being performed.

The hoisting and steering mechanisms are controllable by the operator from the deck of the revolving platform by the disengagement of the swing mechanism and the use of the swinging engine to steer, with the swinging deck stationary in any position. In a word, the use of a single engine to swing the deck and steer the machine by direct connection, the whole being entirely in control of the operator from the deck.

In the case of other makes of power shovels or excavating machines with which I am familiar, a common method of steering is to connect the steering axle to the revolving body, and by the movement of said revolving body in either direction, to maneuver the steering wheels; or by mounting a separate engine on the deck of the revolving body and by locking the body in a stationary position with respect to the truck frame, the steering wheels can be maneuvered by connecting said steering wheels with the engine.

These devices or means have well known disadvantages due to loss of time in making connections to the truck frame, and in steering by revolving the upper body in cramped quarters.

It is therefore the object of my invention to provide a power shovel, or excavating machine which avoids the above mentioned difficulties and other disadvantages familiar to those whose duties are to operate such machines.

In attaining said object, an arrangement of gearing is adopted to provide the extra power for using a single line hoist, in place of a three line hoist as commonly used on this type of machine; the purpose being to use a single line hoist and an arrangement of machinery to multiply power, and avoid the necessity of adding any more shafting or gearing, and at the same time providing for propulsion from the same shaft.

Preceding a more particular description of my invention, reference is made in general terms to the accompanying drawings, of which Figure 1 is a side elevation of a power shovel or excavating machine constructed in accordance with my invention; Fig. 2 is a plan view of the swinging deck; Fig. 3 is a front elevation of the machine, the boom being removed and other parts being shown in section; Fig. 4 is a bottom plan view of the carriage; and Fig. 5 is a detail of the ratchet stop for the swinging deck. Throughout the specification and drawings similar reference characters indicate corresponding parts.

Referring more particularly to said drawings, 1 represents the propelling wheels which are mounted on an axle 2 journaled in bearings —3— on the under side of a frame —4—. The forward end of the frame is provided with a fifth wheel —5— to which is pivoted, at its central point, a steering axle —6— upon which, steering wheels —7— are mounted. The parts above described constitute a truck upon which the operating mechanism of the machine is mounted. Mounted upon the frame —4— is a circular track —8— upon which travel rollers —9— supporting a swinging deck —10—. The deck —10— is held in a central position by a pintle —11— (Fig. 3.), received by a bearing —12— of the frame —4—. Extending from the forward end of the deck —10— is a boom —13— (Fig. 1) which supports a thrusting engine —14— in operative relation with a handle —15— of a bucket —16—. The bucket is also operated by a single cable or line hoist —17— attached thereto and which passes over a sheave —18— on the upper end of the boom —13—. The upper end of the boom —13— is supported by brace rods —19— and —20—, and a frame —21— on the deck —10—. The end of the cable —17— opposite the bucket, is attached to a hoisting drum —22— (Fig. 3.) mounted on a shaft —23—, supported in a frame —24— on the deck —10—. The drum —22— is driven from a gear —25— also mounted on the shaft 23, through the agency of any suitable form of clutch (not shown) but which is well known in the art. The hoisting drum —22— is provided with a brake drum —70— and a clutch drum —71—. The gear —25— is in mesh with a pinion —26— rigidly secured to a shaft —27— which in turn is provided with a gear —28— in mesh with a pinion —29— on the crank shaft of a hoisting and propelling engine —30—. The engine —30— is mounted on the swinging deck —10—. Through the agency of the above mechanism, the bucket —16— is elevated through the single hoist cable —17—. The machine as a whole is propelled by the engine —30— and the wheels —1— by the following train of mechanism. Freely mounted on the shaft —27— and adapted to be attached thereto by means of a clutch —31— (Fig. 3) is a bevel pinion —32— in mesh with a bevel gear —33— mounted on the upper end of a vertical tubular shaft —34— journaled in the pintle —11— and a bearing —35— on the frame —4—. The lower end of the shaft —34— is provided with a bevel gear —36— in mesh with a bevel gear —37— on a shaft —38—. The shaft —38— is journaled in a frame —39— (Fig. 4) on the under side of the frame —4—, and said shaft —38— carries a bevel pinion —40— in mesh with bevel gear —41— on the axle —2—.

When it is desired to propel the machine, the gear —32— is secured to the shaft —27— by the clutch —31— which permits the wheels —1— to be rotated by the engine —30—. The clutch —31— may be actuated by any well known means. It will thus be seen that, by this construction, the bucket may be elevated and the machine propelled by the same engine.

The deck —10— and the parts carried thereby are swung on the pintle —11— by the following means: The track —8— is provided with gear teeth —43— in mesh with a pinion —44— (Fig. 1) mounted on a vertical shaft —45— journaled in the deck —10—. The upper end of the shaft —45— carries a bevel gear —46— (Fig. 2) in mesh with a bevel gear —47—. The gear —47— is mounted on a sleeve —48— journaled in a bearing —49—. The sleeve —48— is provided with a clutch —50— adapted to be connected to a sliding gear —51— mounted on a shaft —52— journaled in the sleeve —48— and a bearing —53—. The sliding gear —51— is in mesh with a pinion —54— of a swinging and steering engine —55— mounted on the deck —10—. When the gear —51— is shifted to place the same in engagement with the clutch —50— and the engine —55— is operated, the pinion —44— will travel around the track —8— thereby swinging the deck —10—. The axle —6— is swung on the fifth wheel —5— by the engine —55— by the following means.

The gear —51— is adapted to be shifted into engagement with a clutch —56— secured to the shaft —52— by means (not shown) but well known in the art. The end of the shaft —52— opposite the clutch —56— is provided with a bevel gear —57— (Fig. 3.) in mesh with a bevel gear —58— mounted on the upper end of a vertical hollow shaft —59— journaled in the shaft —34—. The lower end of the shaft —59— is provided with a bevel gear —60— in mesh with a bevel gear —61— (Fig. 4) on the end of a screw shaft —62— journaled in bearings —63— on the under side of the frame —4—. The screw shaft —62— carries a nut —64— pivotally secured to a lever —65— fulcrumed at —66— to the frame —4—. The lever —65— is connected to the axle —6— by a rod —67— and a U-bolt —68—. When the screw shaft —62— is rotated in either direction (it being understood that the engine —55— is reversable as is also the engine —30— ), the nut —64—, through the agency of the lever —65— and rod —67—, will move the axle —6— and wheels —7— on the fifth wheel —5—, thereby steering the machine during the propelling operation. When the gearing —51— is out of engagement with the clutch —50—, and the prime mover —55— is connected to the steering mechanism through the clutch —56—, the deck is prevented from swinging by a pawl —73— (Figs. 2 and 5) adapted to be placed in engagement with a ratchet —72— on the sleeve —48— thereby preventing the pinion —44— from rotating.

The engines —30— and —55—, in the present instance are of the steam or compressed air type, but it is to be understood that the power generators may be of any well known type. When the said engines —30— and —55— are operated by steam the rear end of the deck —10— is provided with a boiler (not shown), which together with the mechanism mounted on said deck, is inclosed in a housing —69—. The shaft —59— is of a tubular form to provide a water connection for the boiler when the machine is operated by steam.

While I have at some length gone into details in describing the improvements embodied in the machine, I do not wish to be limited to details wherever they may be eliminated or displaced by other means without changing or affecting the objects of the invention, which are to provide a machine of the character described which provides means in a power shovel by which all operations are performed and controlled by the operator on the deck.

Having described my invention, I claim:

1. In an excavating mechanism, a truck having propelling wheels, a deck rotatably mounted on said truck, a boom carried by said deck, an excavating dipper carried by said boom, a hoisting drum mounted on said deck, a single line cable connecting said drum with said dipper, a gear connected with said drum, a hoisting and propelling engine mounted on said deck, a shaft for said engine, an intermediate shaft having geared connection with said engine shaft, a pinion secured to said intermediate shaft and meshing with the gear for said drum, a second pinion mounted on said intermediate shaft, a clutch to connect said second pinion with and disconnect the same from said intermediate shaft, and an operative connection between said second pinion and said propelling wheels.

2. In an excavating mechanism, a truck having propelling wheels, a deck rotatably mounted on said truck and having a hollow pintle journaled in a vertical bearing carried by said truck, a boom mounted on said deck, an excavating dipper carried by said boom, a hoisting drum mounted on said deck, a single line cable connecting said drum with said dipper, a gear connected with said drum, a hoisting and propelling engine mounted on said deck, a shaft for said engine, an intermediate shaft having geared connection with said engine shaft, a pinion secured to said intermediate shaft and meshing with the gear of said drum, a beveled pinion mounted on said intermediate shaft, a shaft journaled in said pintle and extending below the bearing of said truck, a beveled pinion secured to the upper end of said shaft and meshing with the beveled pinion on said intermediate shaft, a geared connection between the lower end of said shaft and said propelling wheels, and a clutch to connect the first mentioned beveled pinion with and disconnect the same from said intermediate shaft.

3. In an excavating mechanism, a truck, a deck mounted on said truck, a boom carried by said deck, an excavating dipper carried by said boom, a hoisting drum mounted on said deck, a single line cable connecting said drum with said dipper, a gear connected with said drum, a hoisting engine mounted on said deck, a shaft for said engine, an intermediate shaft having geared connection with said engine shaft, and a pinion secured to said intermediate shaft and meshing with the gear for said drum.

4. In an excavating mechanism, a truck having propelling wheels and steering wheels, a deck rotatably mounted on said truck and having a hollow pintle journaled in a bearing carried by said truck, a boom carried by said deck, an excavating dipper carried by said boom, a hoisting drum mounted on said deck, a single line cable connecting said dipper with said drum, a hoisting and propelling engine mounted on said deck, a shaft for said engine, an intermediate shaft having a geared connection with said engine shaft, a pinion secured to said intermediate shaft and meshing with the gear for said drum, a beveled pinion mounted on said intermediate shaft, a hollow shaft extending through said hollow pintle to a point below said truck bearing, a beveled pinion secured to the upper end of said hollow shaft and meshing with the first mentioned beveled pinion, a geared connection between the lower end of said hollow shaft and said propelling wheels, a clutch to connect said first mentioned beveled pinion with and to disconnect the same from said intermediate shaft, a steering shaft journaled in said hollow shaft, an operative connection between the lower end of said steering shaft and said steering wheels, a shaft mounted on said deck and having geared connection with the upper end of said steering shaft, a gear on the last mentioned shaft, a steering engine mounted on said deck and having a shaft, and a gear mounted on the last mentioned engine shaft and meshing with the last mentioned gear.

5. In an excavating mechanism, a truck having steering wheels, a deck rotatably mounted on said truck and having a hollow pintle journaled in a vertical bearing on said truck, a shaft rotatably mounted within said hollow pintle and operatively connected at its lower end with said steering wheels, a horizontal shaft extending rearwardly from said steering shaft and having a geared connection therewith, a steering engine mounted on said deck and having a shaft, and a geared connection between said engine shaft and said rearwardly extending shaft.

6. In an excavating mechanism; a truck having steering wheels, a deck rotatably mounted on said truck and having a hollow pintle journaled in a vertical bearing carried by said truck, a steering shaft rotatably mounted within said pintle and having geared connection at its lower end with said steering wheels, an annular rack mounted on said truck concentric with the axis of rotation of said deck, a vertical shaft journaled in said deck, a pinion carried by said shaft and meshing with said annular rack, a shaft having one end geared to the upper end of said steering shaft and extending to a point remote therefrom, a steering and swinging engine mounted on said deck and comprising a shaft, and means for establishing a geared connection between said engine shaft and either the last mentioned shaft or said vertical shaft.

7. In an excavating mechanism, a truck having steering wheels, a deck rotatably mounted on said truck and having a hollow pintle journaled in a vertical bearing carried by said truck, a steering shaft rotatably mounted within said pintle and having geared connection at its lower end with said steering wheels, an annular rack mounted on said truck concentric with the axis of rotation of said deck, a vertical shaft journaled in said deck, a pinion carried by said shaft and meshing with said annular rack, a shaft having one end geared to the upper end of said steering shaft and extending to a point remote therefrom, a gear secured to said vertical shaft above said deck, a pinion rotatably mounted on the last mentioned shaft and meshing with the gear on said vertical shaft, a gear loosely mounted on said last mentioned shaft, means for connecting said gear either with said last mentioned shaft or with the pinion mounted on said last mentioned shaft, a steering and swinging engine mounted on said deck and comprising a shaft, and a pinion carried by said engine shaft and meshing with the gear on said last mentioned shaft.

8. In an excavating mechanism, a truck having steering wheels, a deck rotatably mounted on said truck and having a hollow pintle journaled in a vertical bearing carried by said truck, a steering shaft rotatably mounted within said pintle and having geared connection at its lower end with said steering wheels, an annular rack mounted on said truck concentric with the axis of rotation of said deck, a vertical shaft journaled in said deck, a pinion carried by said shaft and meshing with said annular rack, a shaft having one end geared to the upper end of said steering shaft and extending to a point remote therefrom, a gear secured to said vertical shaft above said deck, a sleeve rotatably mounted on the last mentioned shaft, held against longitudinal movement thereon and having a pinion meshing with the gear on said vertical shaft, said sleeve having a clutch member secured to one end thereof, a gear rotatably and slidably mounted on said last mentioned shaft, a clutch member secured to said last mentioned shaft beyond said gear, clutch members carried by said gear and adapted to be moved into operative engagement with either the clutch member on said sleeve or the clutch member on said last mentioned shaft, a steering and swinging engine mounted on said deck and comprising an engine shaft, a pinion secured to said engine shaft and in permanent mesh with said slidable gear, and means for imparting axial movement to said gear.

In testimony whereof I affix my signature.

CHARLES LOTTE.